US005984596A

United States Patent [19]

Fehrle et al.

[11] Patent Number: 5,984,596

[45] Date of Patent: Nov. 16, 1999

[54] INSERTABLE TOOL AND TOOL HOLDER FOR DRILLING AND/OR IMPACTING ELECTRIC MACHINES

[75] Inventors: Siegfried Fehrle; Rolf Mueller, both of Leinfelden-Echterdingen; Vinzenz Haerle, Neckartenzlingen; Sven Kageler, Leinfelden-Echterdingen, all of Germany

[73] Assignee: Robert Bosch GmbH, Stuttgart, Germany

[21] Appl. No.: 09/051,422

[22] PCT Filed: Oct. 1, 1996

[86] PCT No.: PCT/DE96/01889

§ 371 Date: Apr. 13, 1998

§ 102(e) Date: Apr. 13, 1998

[87] PCT Pub. No.: WO97/13602

PCT Pub. Date: Apr. 17, 1997

[30] Foreign Application Priority Data

| | | | |
|---|---|---|---|
| Oct. 12, 1995 | [DE] | Germany | 195 39 414 |
| Feb. 7, 1996 | [DE] | Germany | 196 04 284 |

[51] Int. Cl.$^{6}$ ..................... B23B 51/02

[52] U.S. Cl. ..................... 408/226; 175/395; 175/415; 279/19.3; 279/75; 408/240

[58] Field of Search ..................... 408/226, 240; 279/19.3, 19.4, 19.5, 19.6, 75; 175/395, 414, 415; 173/104

[56] References Cited

U.S. PATENT DOCUMENTS

| | | | |
|---|---|---|---|
| 4,107,949 | 8/1978 | Wanner et al. | 408/226 |
| 4,131,165 | 12/1978 | Wanner et al. | 279/19.3 |
| 5,028,057 | 7/1991 | Wanner | 408/226 |
| 5,076,371 | 12/1991 | Obermeier et al. | 408/226 |
| 5,340,245 | 8/1994 | Bloechle et al. | 408/226 |
| 5,427,481 | 6/1995 | Selb et al. | 408/226 |

FOREIGN PATENT DOCUMENTS

| | | | |
|---|---|---|---|
| 456003 | 11/1991 | European Pat. Off. | 408/226 |
| 43 17 273 A1 | 12/1994 | Germany . | |
| 429 630 | 8/1967 | Switzerland . | |

*Primary Examiner*—Daniel W. Howell
*Attorney, Agent, or Firm*—Michael J. Striker

[57] ABSTRACT

A combination of an insertable tool (2), e.g. a drill or chisel, for an electrical machine for drilling and/or impact operation and a tool holder (20) for the insertable tool is disclosed. The insertable tool includes a tool shaft (11) provided with a round core cross section (1) not weakened or reduced at any point along the tool shaft (11) up to an inserted tool shaft end. The tool shaft has longitudinal struts (6) for torque transmission and axial guidance extending beyond the round core cross section (1) and the longitudinal struts (6) are shaped to merge with the core cross section in front of a cylindrical end portion (3). The tool holder (20) has a receiving sleeve (21) including a front portion (21*a*) for sealing and guidance of the tool shaft (11) and another portion (21*b*) including radially inwardly protruding longitudinal cleats (25) engagable between the longitudinal struts (6) for rotary driving of the insertable tool (2), an impact bolt (24) arranged for impact on the tool shaft (11) of the insertable tool (2) and at least one locking body (23) arranged between two adjacent longitudinal cleats (25) so that the at least one locking body (23) is radially movable between a locking position locking the insertable tool (2) in the receiving sleeve (21) and another position in which the insertable tool is released from the receiving sleeve.

21 Claims, 4 Drawing Sheets

24
3
8b
7
11
6
13
8a
4
1
10
2
5

6
15
12
7
14

12
α=40°
7
14

3
1
8b
6
8a
11
13
2b
2b
4

15
7
12

3
1
8b
6
8a
11
13
3b
3b
4

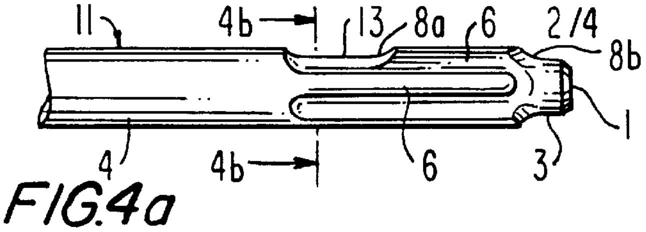
FIG.4a
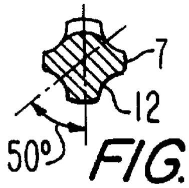
FIG.4b
FIG.5a
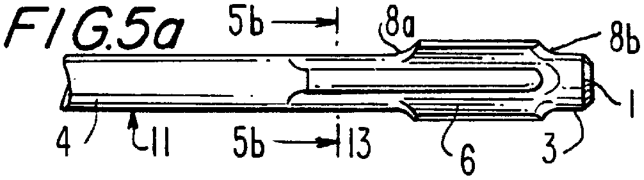
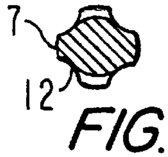
FIG.5b
FIG.6a
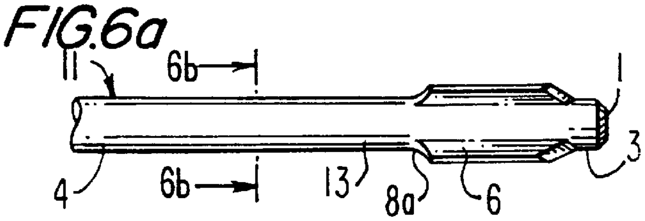
FIG.6b
FIG.7a
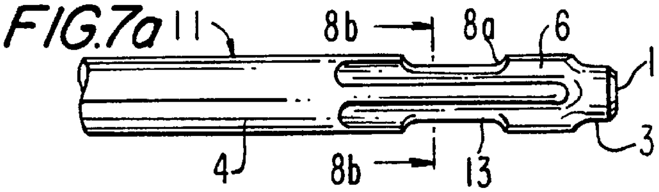
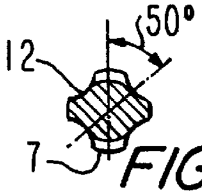
FIG.7b
FIG.8a
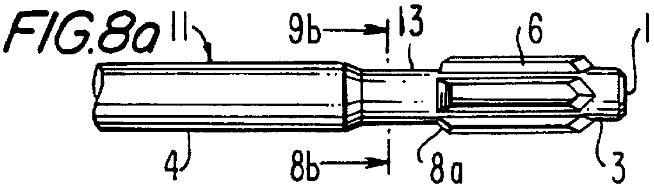
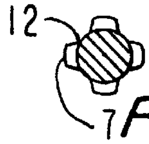
FIG.8b
FIG.9a
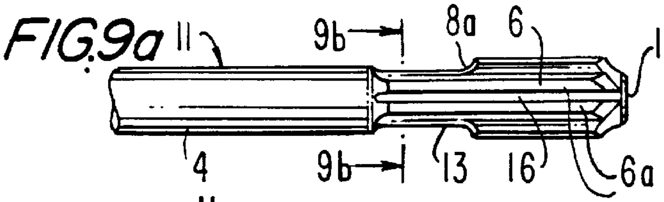
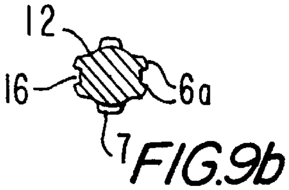
FIG.9b
FIG.10a
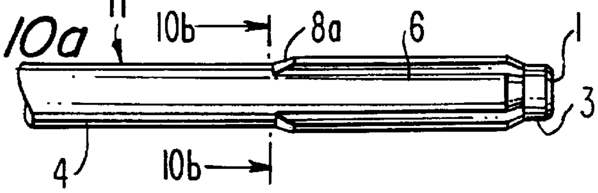
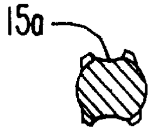
FIG.10b FIG. 11a
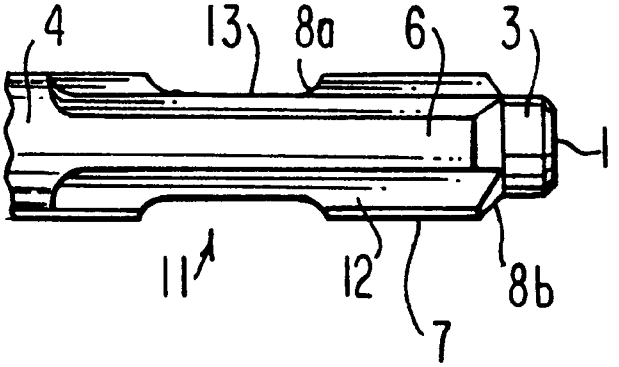
FIG. 11b
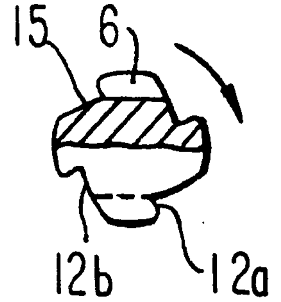
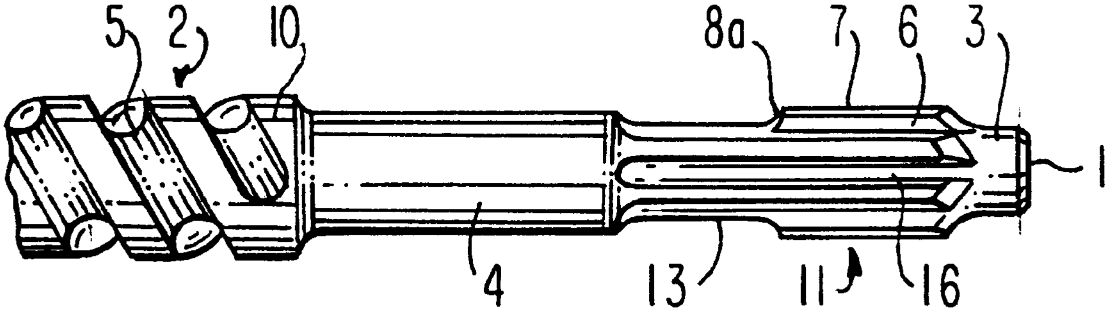
FIG. 12

INSERTABLE TOOL AND TOOL HOLDER FOR DRILLING AND/OR IMPACTING ELECTRIC MACHINES

BACKGROUND OF THE INVENTION

1. Field of the Invention

The present invention relates to an insertable tool for an electrical machine, particularly a hand-held tool for drilling and/or impact operations, including a tool shaft that can be inserted into a respective tool holder of the machine, the shaft having means for rotary driving and axial locking. The invention also relates to a tool holder for the machine having a receiving sleeve and an impact bolt for the tool shaft of the insertable tool.

2. Prior Art

From German Patent Disclosure DE 43 17 273 A1, embodiments for improving the rotary driving of insertable tools are already known, in which, in addition to the rotary driving grooves on the tool shaft, rotary driving cleats are also disposed on the circumference of the shaft. Although this does increase the rotary driving face and thus reduces wear, nevertheless the core cross section of the shaft is still weakened by both the rotary driving grooves and locking troughs, so that in impact operation, the shock wave introduced into the tool shaft by the impact bolt of the machine is not optimally carried to the tool tip. Moreover, notching effects arise at the base of the rotary driving grooves, and under severe rotary stress or rebound impact if the chiseling tool is titled can lead to breakage of the shaft. Such embodiments are therefore adequately stable and wear-resistant only for lighter-weight machines and lighter-weight insertable tools.

Swiss Patent CH 429 630 also discloses an impact drill head as an insertable tool, mounted on the end of a drill rod linkage for large drilling tools. Its tool shaft is embodied as a splined shaft, but for axial locking a chord-like recess that weakens the core of the shaft is provided for receiving a locking body inserted at the drill head holder. Once again, this embodiment leads to weakening of the drill head and to an impairment of the shock waves during operation.

SUMMARY OF THE INVENTION

It is an object of the present invention to provide an improved insertable tool for an electrical machine, especially a hand-held machine for drilling and/or impact operations, of the above-described kind, having a greater impact resistance and reduced wear than prior art insertable tools.

This object and others which will be made more apparent hereinafter are attained in an insertable tool for an electrical machine having a tool shaft insertable into a tool holder of the machine and including means for rotary driving of the tool shaft and axial locking of the tool shaft in the tool holder.

According to the invention the tool shaft has a cylindrical end portion at an end of the tool shaft inserted in the tool holder and the tool shaft is provided with a round core cross section not weakened or reduced at any point along the tool shaft up to the end of the tool shaft. The means for rotary driving and axial locking include a plurality of longitudinal struts for torque transmission and axial guidance extending from the tool shaft beyond the round core cross section and distributed uniformly around the tool shaft circumference. At least one longitudinal strut has a shoulder or front end face for axial locking and the longitudinal struts merge with the core cross section in front of the cylindrical end portion.

It is another object of the present invention to provide an improved tool holder for this insertable tool in the electrical machine, which also has greater impact resistance and reduced wear in comparison to prior art tool holders.

According to the invention the tool holder includes a receiving sleeve for the tool shaft of the insertable tool and the receiving sleeve has a front portion with a smooth interior surface for sealing and guidance and another portion located behind the front potion in a tool insertion direction. Radially inwardly protruding cleats for rotary driving the tool are located in the another portion, which engage between the longitudinal struts of the insertable tool; and at least one locking body that is radially movable between a locking position in which the insertable tool is locked in the tool holder and another position in which the tool is released.

The insertable tool according to the present invention has the advantage that a virtually constant system cross section from the impact bolt to the core cross section of the insertion shaft, through the sealing and guide region and the drill core, for instance of a chisel diameter, enables unimpeded optimum shock transmission course of the shock. The system cross section is not reduced or weakened at any point. It is merely widened, specifically optionally by means of a beater collar in the device, by the struts of the insertion shaft, optionally by the sealing and guide region, and by drill threads. The longitudinal struts then perform the rotary driving, the rotational securing in the event of rebound impacts or a tilted tool, and the axial locking.

By means of this construction, in existing devices with a fixed impact bolt diameter, the insertion shaft of the insertable tool can be realized with substantially greater strength and suitable wear performance.

A circular core cross section of the insertable tool in the region of its insertion shaft assures the best possible centering. The centering is the prerequisite for the purest possible axial motion—for instance in chiseling—and for the alignment of the shock.

The axial motion and orientation of the shock are in turn the prerequisite for an optimal progress of the work and hence for the least possible shock losses and bending. Because bending strain is avoided, the threat of breakage is reduced, on the one hand, and on the other there is better noise abatement.

Advantageous refinements of and improvements to the characteristics recited in the main claim are obtained by the provisions recited in the dependent claims. For instance, the most constant system cross section, especially in the transition region from the impact bolt to the insertable tool, is especially advantageous for the unimpeded course of the shock waves. A portion having the pure core cross section of the tool shaft is therefore provided on the end of the tool shaft, for the sake of optimal introduction of the shock, before where the region with the longitudinal struts for rotary driving adjoins it. This rear portion is advantageous not only for the introduction of the shock wave but also for performing shaft guidance. Moreover, this portion may be embodied in various lengths or omitted entirely, thus serving as a code means for insertable tools that are unsuitable for impact operation. That is, the shortened or omitted portion assures that the impact bolt of the machine will no longer strike the shaft of the insertable tool.

As a result of gentle transitions, such as radii or concave shapes between the core cross section and longitudinal struts or the sealing and guide region, the shock proceeds with as little impedance as possible.

The two functions of axial locking and rotary force transmission between the tool receptacle and the tool shaft can be realized in the serial arrangement by merely a single locking element; that is, for this purpose possibly only a single longitudinal strut with a front face end will be needed. This locking element may also be used multiple times along the circumference, to enable inserting the insertable tool in a plurality of predetermined positions into a tool holder, using only a single lockable locking body. The two functions are disposed axially one behind the other. However, the two functions of axial locking and rotational force transmission can also be disposed side by side on the shaft circumference. In that case, longitudinal struts without any locking recess are located on both sides of a locking recess in a longitudinal strut, or a shortened longitudinal strut. Thus both functions can be accommodated on a short axial portion.

The combination of a serial and parallel arrangement of longitudinal struts and locking elements makes possible a space-saving arrangement of the functions that makes optimal use of the insertion shaft. The shorter struts enable the axial locking in the same axial portion of the tool shaft, while directly adjacent longer struts with a correspondingly greater flank surface area are available for the rotational force transmission. Continuous longitudinal struts to the sealing and guide region reinforce the guidance of the insertable tool and the course of the shock and disproportionately reinforce the inertia or moment of resistance per unit of surface area and thus the security against breakage of the tool shaft. If the arrangement that combines locking and torque transmission on a relatively small circumferential portion is chosen, then this combination can be repeated relatively often over the entire circumference. This means that the maximum rotary angle needed in order to find the correct positioning for inserting the tool shaft into the tool receptacle can be smaller. For optimizing wear, care must be taken that the width of the longitudinal struts in proportion to the grooves or interstices between them should be allocated approximately equally. As a result, the insertable tools and tool holders undergo uniform stress and their wear is reduced.

In a tool holder according to the invention, it is advantageous that behind the front sealing and guide region of the receiving sleeve, the locking body is disposed between two longitudinal cleats, so that it does not engage the core cross section of the shaft. Another advantage is that the impact bolt of the machine is guided optimally regard to the shaft end of the insertable tool, so that the shock waves can be carried to the tool tip with as little impedance as possible.

Because both the impact bolt and the end of the shaft are received in the rear portion of the receiving bore of the tool holder, an insertion system is advantageously obtained for the insertable tool and the tool holder. The insertion system according to the invention the impact bolt of the tool holder, the end of the shaft, the core cross section of the insertable tool, and its bore core, for instance its chisel diameter, have a virtually constant system cross section.

BRIEF DESCRIPTION OF THE DRAWING

The objects, features and advantages of the invention will now be illustrated in more detail with the aid of the following description of the preferred embodiments, with reference to the accompanying figures in which:

FIGS. 4*a* and 4*b* are, respectively, a side view and a cross-sectional view of a fourth embodiment of a shaft end of an insertable tool according to the invention with an unweakened core cross section;

FIGS. 5*a* and 5*b* are, respectively, a side view and a cross-sectional view of a fifth embodiment of a shaft end of an insertable tool according to the invention with an unweakened core cross section;

FIGS. 6*a* and 6*b* are, respectively, a side view and a cross-sectional view of a sixth embodiment of a shaft end of an insertable tool according to the invention with an unweakened core cross section;

FIGS. 7*a* and 7*b* are, respectively, a side view and a cross-sectional view of a seventh embodiment of a shaft end of an insertable tool according to the invention with an unweakened core cross section;

FIGS. 8*a* and 8*b* are, respectively, a side view and a cross-sectional view of a eighth embodiment of a shaft end of an insertable tool according to the invention with an unweakened core cross section;

FIGS. 9*a* and 9*b* are, respectively, a side view and a cross-sectional view of a ninth embodiment of a shaft end of an insertable tool according to the invention with an unweakened core cross section;

FIGS. 10*a* and 10*b* are, respectively, a side view and a cross-sectional view of a tenth embodiment of a shaft end of an insertable tool according to the invention with an unweakened core cross section;

FIGS. 11*a* and 11*b* are, respectively, a side view and a cross-sectional view of an eleventh embodiment of a shaft end of an insertable tool according to the invention with an unweakened core cross section;

FIG. 12 is a side view of a tool shaft according to the invention that fits in the tool holder shown in FIG. 13.

DESCRIPTION OF THE PREFERRED EMBODIMENTS

Figures 1A, 1B, 2A, 2B, 3A, 3B:
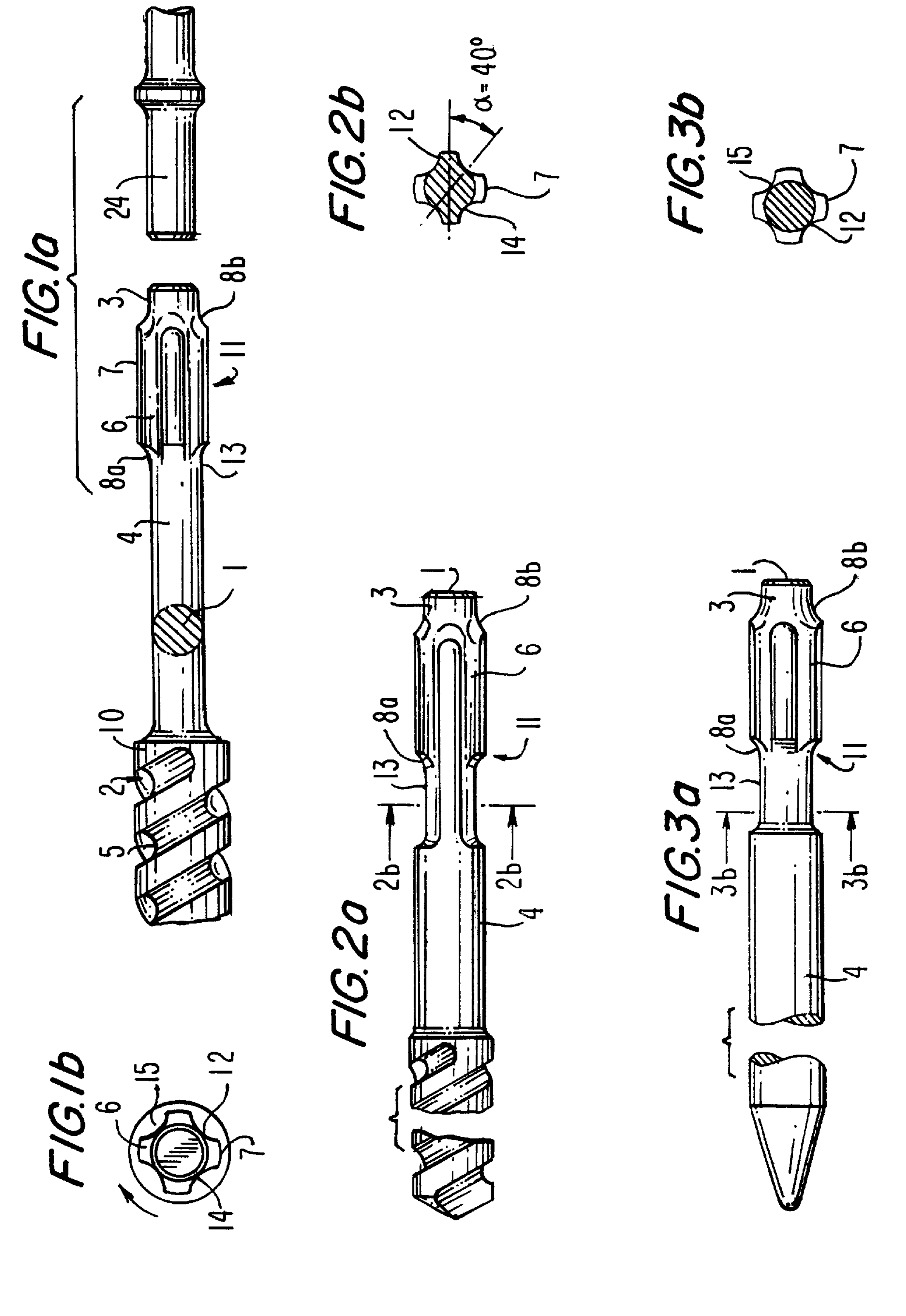
FIGS. 1*a* and 1*b* are, respectively, a side view and a cross-sectional view of a first embodiment of an insertable tool according to the invention with an unweakened core cross section.
FIGS. 2*a* and 2*b* are, respectively, a side view and a cross-sectional view of a second embodiment of an insertable tool according to the invention with an unweakened core cross section.
FIGS. 3*a* and 3*b* are, respectively, a side view and a cross-sectional view of a third embodiment of an insertable tool according to the invention with an unweakened core cross section.

An insertable tool 2, in this embodiment a percussion drill, with a tool shaft 11 acting as the inserted shaft, for a drilling machine, particularly a hammer drill, is shown in FIGS. 1*a*) and 1*b*). Longitudinal struts 6 are located on the tool shaft 11, which perform axial guidance, rotational force transmission and rotational securing in the event of rebound impacts or canting, as well as axial locking. The rotary driving or rotational securing is effected via a tool holder (FIG. 13) of the machine, and the impacts are exerted by an impact bolt 24, which is moved back and forth in a driven spindle sleeve of the machine and is shown separately in FIG. 1.

The tool shaft 11 has an unweakened core cross section 1, extending as far as the end of the shaft, preferably with a 10 mm diameter. Together with the approximately equal cross section of the impact bolt 24 in the device, a sealing and guide region 4, and the drill core 5, forms an approximately constant system cross section. Over the core cross section 1, four longitudinal struts 6 are distributed uniformly. The outer contour 7 of the struts preferably has a diameter of 14 mm, which is embodied as a circle element. The strut flanks 12 extend in inclined fashion toward one another, so that the longitudinal struts 6 become wider toward the base, which in non-cutting production enables easy mold release. The shape of the flanks 12 and face ends 8 of the struts is curved, for instance being concave, so that a gentle transition from the core cross section 1 to the longitudinal struts 6 is achieved for widening. The transition from the flanks 12 and face ends of the struts toward the outer contour can be rounded or sharp-edged. The shape from one flank of a strut through the interstice 15 to the next flank of a strut is circular or concave, and the strut flanks 12 of the adjacent longitudinal struts 6 are connected to one another via a concave region 14 extending as far as the core cross section 1. Toward the working area, the insertable tool 2 has a sealing and guide region 4. For an optimal shock behavior, this region 4 has the same diameter as the core cross section 1. The longitudinal struts 6 extend in the axial direction of the tool shaft. Toward the end of the shaft, they have an obliquely extending, rounded rear face end **8*b*, and toward the tool tip they also have a front, concavely extending face end 8*a*. These face ends 8*a* serve the purpose for engagement of a locking body that can be locked in the tool holder of FIG. 13 in a machine in order to axially lock the tool shaft 11. For the axial motion of the tool shaft 11 that is allowed by the locking body, a region 13 is provided, which is adjoined toward the tool tip by the sealing and guide region 4. In the present exemplary embodiment, both portions 4 and 13 have the core cross section 1. Since the longitudinal struts merge before the end of the shaft with the core cross section 1, the end of the shaft forms a cylindrical portion 3 having the core cross section 1 of the tool shaft 11. Because four identical longitudinal struts 6, distributed uniformly over the circumference, have a front concavely inclined face end 8*a*, the tool shaft 11** can be inserted into a tool holder of the machine and locked in four positions, each with a 90° offset from the next.

FIG. 2 shows a further exemplary embodiment of a percussion drill, in which the diameter of the sealing and guide region 4 is larger than the cross section 1, specifically being as large as the outer diameter of the longitudinal struts 6. For forming the front concave face end **8*a* of two opposed longitudinal struts 6, these longitudinal struts are provided with a longitudinal recess 13, which extends as far as the core cross section 1 and which can be engaged axially displaceably by a locking body in the tool holder of the machine. Two further longitudinal struts 6 are disposed 90° apart for that purpose. They have no longitudinal recesses for axial locking but instead terminate in the guide portion 4 of the tool shaft 11. In this version, the adjacent longitudinal struts 6 are of unequal width, and the adjacent interstices 15, which are embodied as longitudinal grooves between the longitudinal struts 6, have a variable offset. Thus the angle $\alpha$ between the narrower longitudinal struts 6 and the center of the adjacent interstices 15 is not 45° as in the case of a uniform distribution; instead, here the angle $\alpha$ is 40°. Since in this case not all the longitudinal struts have a locking function, the variable offset of the interstice between the longitudinal struts prevents incorrect locking, in such a way that a discontinuous longitudinal strut 6 comes to rest in the tool holder in a longitudinal groove having a locking body as in FIG. 13**.

FIG. 3 shows a chisel as the insertable tool, in which the longitudinal struts 6 and the shaft end 3 are embodied in the same way as on the tool shaft of FIG. 1. Here, however, the sealing and guide region 4 of the tool shaft 11 is larger than the core cross section 1, and between region 4 and the longitudinal struts 6, a portion 13 that is reduced to the core cross section 1 and is intended for engagement by a locking body is provided over the entire circumference of the tool shaft.

As a further exemplary embodiment, FIG. 4 shows a tool shaft 11 of an insertable tool, with an embodiment of the longitudinal struts 6 as in FIG. 2, with the difference that here only the upper (in FIG. 4) longitudinal strut 6 has a longitudinal recess 13 for the engagement of a locking body. Hence this shaft can be inserted only in one position in a tool holder having a locking body as in FIG. 13.

FIG. 5 shows a further exemplary embodiment of a tool shaft, similar to that of FIG. 1 except that here two of the four equal-width longitudinal struts 6 have a greater length and do not terminate until the sealing and guide region 4 in the core cross section 1. Thus this shaft can be inserted into a tool receptacle only in positions 180° apart from one another.

As still another exemplary embodiment, FIG. 6 shows a tool shaft with only two longitudinal struts 6, which disposed offset by 180° from one another on the core cross section 1 of the tool shaft.

FIG. 7, in a further exemplary embodiment, shows a tool shaft similar to that of FIG. 2, but with the difference that here the longitudinal recesses 13 for the axial locking are provided in the middle of the two wider longitudinal struts 6 that face one another.

FIG. 8, in reliance on FIG. 3, shows a tool shaft in which the rear ends of the longitudinal struts 6 are each embodied as wedge-shaped, to make it easier to insert them into the corresponding tool receptacle. Also, here the sealing and guide region 4 is larger in diameter than the core cross section 1 but not as large as the outer diameter of the longitudinal struts 6.

FIG. 9 shows a tool shaft 11, in which two identical longitudinal struts 6, facing one another, each with one longitudinal recess 13 for axial locking are provided on the core cross section 1. In addition, offset from them are two pairs **6*a*, facing one another, of longitudinal struts 6 on the core cross section 1; each of the pairs 6*a* is separated from its neighbors by a trapezoidal longitudinal groove 16. Once again—as in FIG. 8—the sealing and guide region 4 has a diameter that is between the diameter of the core cross section and the outer diameter of the longitudinal struts 6**.

In the exemplary embodiment of FIG. 10, only the rear portion 3 on the end of the tool shaft 11 forms the core cross section 1, while conversely both the sealing and guide region and the regions of the tool shaft between the longitudinal struts 6 have a larger diameter. The guidance of the insertable tool in the tool receptacle of a device can be effected here over the entire axial length of the tool shaft. When this tool shaft is produced with a mold (without metal-cutting machining), the raw material diameter is preserved, except for the rear end portion 3, for guidance. The longitudinal struts 6 are provided by indenting the longitudinal depressions **15*a* down to the diameter of the core cross section 1, on both sides of the depression 15*a* by means of positive displacement of material. The region 4 for sealing and guidance of the tool shaft is unchanged in its geometry by the production method and thus assures the definitive outset tolerance. Only the middle region of the tool shaft having the longitudinal struts 6 for the rotational force transmission and locking is changed. Production involving a mold is also possible with the tool shafts of FIGS. 8 and 9, since the struts are designed such that they can be removed from a mold of a pressing tool, since their flanks have removed from a mold of chamfers and their ends are without undercuts. The longitudinal struts are designed there in such a way that the tool shaft, depending on its pitch can be machined while rotated relative to the pressing tool in the shaping machining process; that is, a tool mold is located multiple times along the circumference of the tool shaft, depending on the pitch frequency, specifically four times in FIG. 8 and in FIGS. 9 and 10 once on each half of the shaft. Spillovers or removed from a mold of edges are located not in the functional regions for the axial guidance and the rotational force transmission and locking but rather in the spaces 15 therebetween. The spaces between the longitudinal struts 6 are located inside the raw material diameter, and the longitudinal struts 6 produced by positive displacement of material are located outside the raw material diameter, which is preserved unchanged in the sealing and guide region 4. In a moldless production of the tool shafts of FIGS. 1–7 that does involve metal-cutting machining, it is possible beginning with the raw material diameter both the locking region 13 and all the spaces 15 between the longitudinal struts 6** can be produced with a profile milling tool.

In the embodiment of FIG. 11, in a modification of that of FIG. 7, the cross sections of the longitudinal struts 6 are no longer embodied symmetrically but instead have an asymmetrical profile. The rotary driving flank 12*a* of the longitudinal struts 6 extends approximately radially here, while conversely the flank 12*b* on the rear that is unstressed by the rotary driving extends in the manner of a chord. As a result, the interstices 15 between the longitudinal struts 6 are wedge-shaped, and the radially extending flank 12*a* is optionally capable of absorbing the rotary driving moment, and the rear flank 12*b*, extending approximately at a right angle, of the adjacent longitudinal strut has a considerably larger surface area, so that any rebound impacts can be better absorbed during tilting or jamming of a chiseling tool. The transition between the two flanks can be sharp-edged or rounded. The asymmetrical shape of the flanks reinforces the function of torque transmission, because it makes it possible for the longitudinal cleats located in the tool holder, which engage the interstices 15 of the longitudinal struts 6 of the tool shaft 11, to have a wedge-shaped cross section. This also prevents tilting when the tool is loaded not only by the moment transmission but also by the shock. An asymmetrical flank shape moreover allows rational production of the tool shaft, because the wedge-shaped interstices 15 allow the use of roller millers with typical square indexable cutting inserts. The asymmetrical struts 6 are designed and optimized for clockwise rotation of the machine. The reverse rotary direction may optionally be necessary only when the insertable tool is being removed from a drilled hole.

In the exemplary embodiment of FIG. 12, a tool shaft 11 for reception in a tool holder 20 of FIG. 13 is shown. The tool shaft of the insertable tool 3 is equivalent to the embodiment of FIG. 9 in terms of the embodiment of the longitudinal struts 6, except that here the sealing and guide region 4 has a diameter which is equal to the outer diameter of the longitudinal struts 6.

Figure 13A:
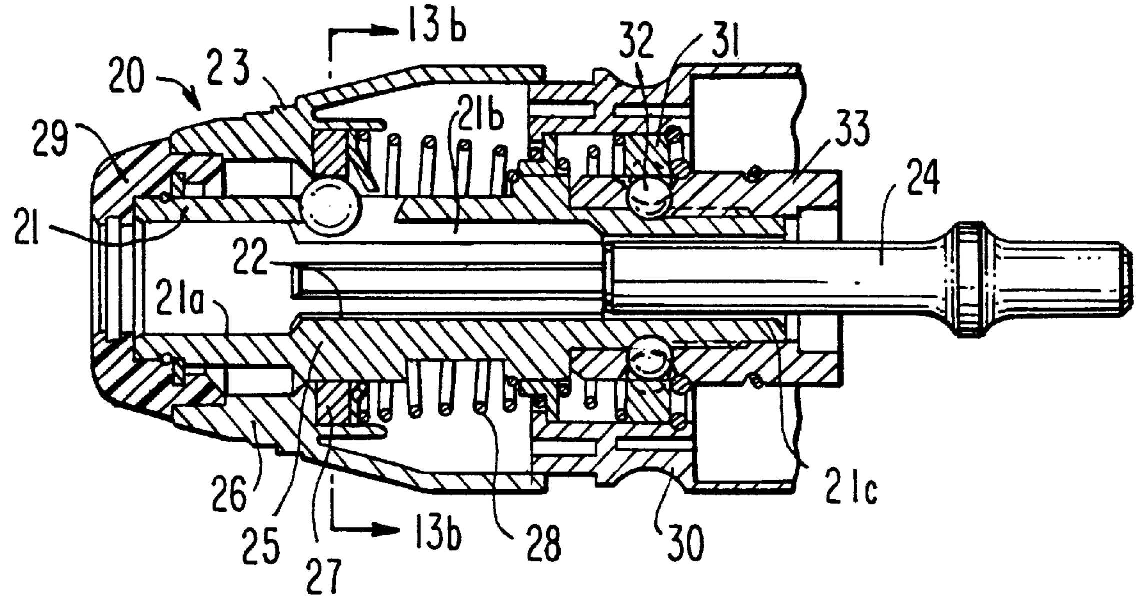
FIGS. 13*a* and 13*b* are, respectively, longitudinal and transverse cross-sectional views through a tool holder according to the invention for the tool shaft shown in FIG. 12.
Figure 13B:
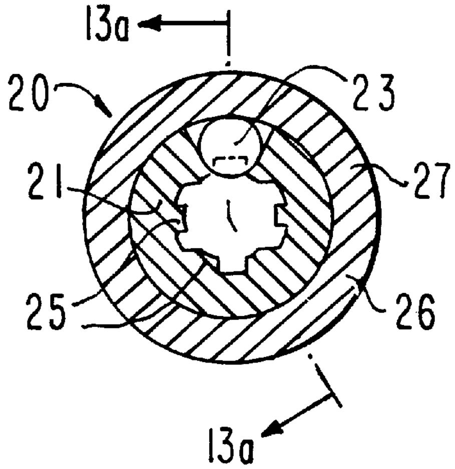

The longitudinal and transverse cross-sectional views in FIGS. 13*a*) and 13*b*) show a tool holder 20 for receiving tool shaft of FIG. 12 has a tubular tool receptacle with a receiving sleeve 21, whose bore diameter is equivalent in the front region to the diameter of the sealing and guide region 4 of the tool shaft 11. In the middle region of the tool receptacle, this receptacle has an insertion profile, which can be seen in FIG. 13*b*, that corresponds to the profile of the tool shaft 11 in the region of the longitudinal struts 6. At this profile, the inside diameter of the receiving sleeve 21 is reduced by the height of longitudinal cleats 25, which protrude inward for torque transmission into the longitudinal grooves 16 and into the interstices 15 between the flanks of the longitudinal struts 6 on the tool shaft. The inside measurement between these longitudinal cleats 25 provides the inside diameter 22, which is approximately equivalent to the core diameter of the tool shaft 11. The longitudinal cleats 25 are necessary to perform the function of torque transmission and moreover serve the purpose of axial guidance. The length of the longitudinal cleats 25 is designed to be long, in order to offer sufficient surface area for the moment transmission. The longitudinal cleats 25 extend forward to and include the region of the locking. In order to lock the insertable tool axially, a locking body, such as a ball 23, is inserted in the front region between two longitudinal cleats 25 into an opening of the receiving sleeve, which can yield radially outward and then be locked by spring force when the tool shaft is introduced. For removal of the tool shaft, however, the locking body must be released manually. This is done by pulling back an actuating sleeve 26 with a ring 27 counter to the force of a spring 28 that presses the ball 23 into the locking position. Located between the longitudinal cleats 25 in the tool receptacle are grooves, which terminate in the rear portion of the tool receptacle at the beginning of a guide portion for the impact bolt 24. The rear portion 3 of a tool shaft 11 inserted into the tool holder 20 is also guided in this region. This region has approximately the same diameter as the core cross section, which in turn corresponds to the diameter of the impact bolt 24. The insertable tool is primarily guided, however, in the front region of the receiving sleeve 21. A sealing lip 29 is also mounted on the tool holder 20 there, in order to seal off against dirt and the like.

The tool holder 20 is removably secured to a drive spindle 33 of the machine. By pulling a mounting sleeve 30 forward, balls 32 can escape outward behind a securing ring 31 as the tool holder 20 is pulled off, and thus release the tool holder. When the tool holder is being slipped onto the drive spindle 33, automatic locking takes place. Since in use first the tool holder 20 and then the securing ring 31 of the locking balls 32 reaches these balls, the balls move outward into the unlocking position. In this position, as the tool holder 20 is slipped farther onto the spindle, these balls push the securing ring 31 back until they escape inward again into the spherical recesses provided for them on the outer circumference of the tool receptacle and come to rest there. By spring force, the securing ring 31 then slides over the locking balls 32 and thus secures the seat of the tool holder on the drive spindle. Both the actuating sleeve 26 and the mounting sleeve 30 can rotate freely so that during operation when touched at the edge they remain stationary despite the rotating tool holder. This means greater safety for the user, since as a result the machine does not absorb any recoil moment.

In a tool shaft of FIG. 12 inserted into the tool holder of FIG. 13, an insertion system according to the invention is obtained. The impact bolt 24 in the tool holder 20, the shaft end 3, the core cross section 1 and the drill core 5, or chisel diameter of the insertable tool 2, have a virtually constant system cross section.

However, the invention is not limited to the exemplary embodiments described, since structural differences between them do not limit the concept of the invention for an insertion system for insertable tools. For instance, the strut flanks on the tool shaft may also be radially or asymmetrically to one another. The longitudinal struts may form a wedge, quarter-circle, or semicircle. The longitudinal struts may also extend obliquely to the axis. In the axial direction as well, a plurality of struts may be disposed in line with one another or offset from one another. The longitudinal recesses on the longitudinal struts for the axial locking need not be extended as far as the core cross section. The sealing and guide region may also have a greater diameter than the outer contour of the longitudinal struts. Coding of insertable tools can be done by means of various lengths of the rear end 3 of the shaft. The shoulders of the sealing and guide region and of the longitudinal struts relative to the core cross section may extend conically or concavely. The longitudinal struts can also be provided with longitudinal grooves, or the interstices of the longitudinal struts can be provided with further struts. If the impact bolt diameter of the machine is less than that of the core cross section on the tool shaft, then a conical phase should be provided on the shaft end, in such a way that the face-end cross section of the tool shaft is equal to that of the impact bolt. If the longitudinal struts 6 are long enough, it may be expedient for the longitudinal recesses 13 for the axial locking not to extend over the entire width of the longitudinal struts but rather over only a portion of this width. It can be attained as a result that at least the torque-transmitting flank of the struts is also retained in the region of the longitudinal recess.

We claim:

1. An insertable tool for an electrical machine having a tool holder, said insertable tool comprising a tool shaft (11) insertable into the tool holder (20) of the electrical machine and means (6,8) for rotary driving and axial locking;

wherein the tool shaft (11) has a cylindrical end portion (3) at an end of the tool shaft inserted in the tool holder and the tool shaft (11) is provided with a round core cross section (1) not weakened or reduced at any point along the tool shaft up to said end of the tool shaft, said means (6,8) for rotary driving and axial locking include a plurality of longitudinal struts (6) for torque transmission to and axial guidance of the tool shaft, said longitudinal struts (6) extending from the tool shaft (11) beyond the round core cross section (1) and distributed uniformly around a circumference of the tool shaft, at least one of said longitudinal struts has a rear end face **(8*b*) for axial locking and said longitudinal struts (6)** are shaped to merge with the core cross section in front of said cylindrical end portion.

2. The insertable tool as defined in claim 1, wherein said rear end face **(8*b*) is inclined obliquely to said shaft and is concave, said at least one of said longitudinal struts having said rear end face (8*b*) has a front end face (8*a*) inclined obliquely to said shaft and concave for axial locking, said tool shaft (11) includes a sealing and guide region (4) separated by a spacing (13) from said front end face (8*a*) of said at least one of said longitudinal struts and said spacing is shaped to receive a locking body (23) for locking the tool shaft (11) in the tool holder (20)**.

3. The insertable tool as defined in claim 2, consisting of a chisel and wherein said sealing and guide region (4) has a cross-section at least as large as said core cross section (1).

4. The insertable tool as defined in claim 1, wherein each of said longitudinal struts (6) has a front end face **(8*a*) inclined obliquely and said front end face (8*a*) is concave in such a manner that the tool shaft (11) is securable in a plurality of positions in said tool holder (20)**.

5. The insertable tool as defined in claim 2, wherein said sealing and guide region (4) has a cross section larger than said core cross section portion and at least a portion of said longitudinal struts (6) terminate in said sealing and guide region (4).

6. The insertable tool as defined in claim 1, wherein said tool shaft (11) is provided with a longitudinal recess (13) extending in as far as the core cross section (1) so that said at least one longitudinal strut has a concave front end face **(8*a*) and a locking body (23) of the tool holder (20) is engagable in the longitudinal recess (13)**.

7. The insertable tool as defined in claim 1, wherein each of said longitudinal struts (6) has a base and two axially parallel-extending strut flanks (12), said the tool shaft (11) has a plurality of concave regions (14) and each of said concave regions extends between facing ones of the strut flanks of an adjacent pair of said longitudinal struts (6).

8. The insertable tool as defined in claim 7, wherein the two axially parallel-extending strut flanks of each of the longitudinal struts (6) are inclined to each other so that each of the longitudinal struts (6) widens toward said base thereof.

9. The insertable tool as defined in claim 1, wherein adjacent ones of said longitudinal struts (6) are of unequal width and said longitudinal struts (6) have variable offset interstices (16) provided therebetween.

10. The insertable tool as defined in claim 1, wherein two of said longitudinal struts (6) are arranged on opposite sides of said tool shaft (11) and are each provided with a longitudinal recess (13) for axial locking and two pairs **(6*a*) of said longitudinal struts are arranged on opposite sides of said tool shaft (11) and are not provided with said longitudinal recess (13), each of said pairs (6*a*) being offset from said two longitudinal struts arranged on said opposite sides and each of said longitudinal struts of each of said pairs being separated from each other by a trapezoidal longitudinal groove (16)**.

11. The insertable tool as defined in claim 1, wherein each of said longitudinal struts (6) has a driving strut flank **(12*a*) extending approximately radially and a non-driving strut flank (12*b*)** unstressed by rotary driving and extending in an approximately chord-like manner.

12. The insertable tool as defined in claim 1, consisting of a drill.

13. A tool holder of an electrical machine for drilling and impact operation, said tool holder comprising a receiving sleeve (21) including a front portion **(21*a*) for sealing and guidance of an insertable tool (2) having a tool shaft (11) and another portion (21*b*) including a plurality of radially inwardly protruding longitudinal cleats (25) for rotary driving of the insertable tool (2)**;

an impact bolt (24) arranged for impact on the tool shaft (11) of the insertable tool when the tool is inserted in the receiving sleeve (21); and at least one locking body (23) arranged between two adjacent ones of said longitudinal cleats (25) so that said at least one locking body is radially movable between a position locking the insertable tool in the receiving sleeve and another position in which the insertable tool is released from the receiving sleeve.

14. The tool holder as defined in claim 13, wherein said another portion **(21*b*) of the receiving sleeve (21) is a middle portion of the receiving sleeve (21), the receiving sleeve (21) has a rear portion (21*c*) on a side of said middle portion opposite from said front portion (21*a*), the rear portion (21*c*) is formed for receiving and guiding said impact bolt (24) and has a diameter approximately equal to a diameter of a core cross-section (1) of the insertable tool (2)**.

15. The tool holder as defined in claim 13, wherein the front portion **(21*b*) of the receiving sleeve (21) has a diameter large enough so that the insertable tool (2) is insertable through the front portion (21*b*) into the middle portion (21*b*) of the receiving sleeve (21)**.

16. A combination of an insertable tool (2) for an electrical machine for drilling and impact operation and a tool holder (20) of the electrical machine for the insertable tool;

wherein the insertable tool comprises a tool shaft (11) provided with a round core cross section (1) not weakened or reduced at any point along the tool shaft up to an end of the tool shaft inserted in the tool holder (20), said tool shaft (11) has a cylindrical end portion (3) at said end of the tool shaft inserted in the tool holder and a plurality of longitudinal struts (6) for torque transmission to and axial guidance of the tool shaft (11), said longitudinal struts (6) extend from the tool shaft (11) beyond the round core cross section (1) and are distributed uniformly around a circumference of the tool shaft, at least one of said longitudinal struts has a rear end face (8*b*) for axial locking and said longitudinal struts (6) are shaped to merge with the core cross section in front of said cylindrical end portion (3); and wherein the tool holder (20) comprises a receiving sleeve (21) including a front portion (21*a*) for sealing and guidance of said insertable tool (2) and another portion (21*b*) including a plurality of radially inwardly protruding longitudinal cleats (25) engagable between said longitudinal struts (6) for rotary driving of the insertable tool (2) when the insertable tool (2) is inserted in the tool holder, an impact bolt (24) arranged for impact on the tool shaft (11) of the insertable tool when the insertable tool is inserted in the receiving sleeve (21) and at least one locking body (23) arranged between two adjacent ones of said longitudinal cleats (25) so that said at least one locking body (23) is radially movable between a locking position locking the insertable tool (2) in the receiving sleeve (21) and another position in which the insertable tool is released from the receiving sleeve.

17. The combination as defined in claim 16, wherein said rear end face (8*b*) is inclined obliquely to said tool shaft (11) and is concave, said at least one of said longitudinal struts (6) having said rear end face (8*b*) has a front end face (8*a*) inclined obliquely to said tool shaft (11) and concave for axial locking, said tool shaft (11) includes a sealing and guide region (4) separated by a spacing (13) from said front end face (8*a*) of said at least one of said longitudinal struts and said spacing is shaped to receive said locking body (23) for locking the tool shaft (11) in the tool holder (20) when said locking body is in said locking position.

18. The combination as defined in claim 16, wherein said insertable tool consists of a drill or a chisel.

19. The insertable tool as defined in claim 1, wherein adjacent ones of said longitudinal struts (6) are of unequal width or said longitudinal struts (6) have variable offset interstices (16) provided therebetween.

20. A tool holder of an electrical machine for drilling or impact operation, said tool holder comprising a receiving sleeve (21) including a front portion (21*a*) for sealing and guidance of an insertable tool (2) having a tool shaft (11) and another portion (21*b*) including a plurality of radially inwardly protruding longitudinal cleats (25) for rotary driving of the insertable tool (2);

an impact bolt (24) arranged for impact on the tool shaft (11) of the insertable tool when the tool is inserted in the receiving sleeve (21); and at least one locking body (23) arranged between two adjacent ones of said longitudinal cleats (25) so that said at least one locking body is radially movable between a position locking the insertable tool in the receiving sleeve and another position in which the insertable tool is released from the receiving sleeve.

21. A combination of an insertable tool (2) for an electrical machine for drilling or impact operation and a tool holder (20) of the electrical machine for the insertable tool;

wherein the insertable tool comprises a tool shaft (11) provided with a round core cross section (1) not weakened or reduced at any point along the tool shaft up to an end of the tool shaft inserted in the tool holder (20), said tool shaft (11) has a cylindrical end portion (3) at said end of the tool shaft inserted in the tool holder and a plurality of longitudinal struts (6) for torque transmission to and axial guidance of the tool shaft (11), said longitudinal struts (6) extend from the tool shaft (11) beyond the round core cross section (1) and are distributed uniformly around a circumference of the tool shaft, at least one of said longitudinal struts has a rear end face (8*b*) for axial locking and said longitudinal struts (6) are shaped to merge with the core cross section in front of said cylindrical end portion (3); and wherein the tool holder (20) comprises a receiving sleeve (21) including a front portion (21*a*) for sealing and guidance of said insertable tool (2) and another portion (21*b*) including a plurality of radially inwardly protruding longitudinal cleats (25) engagable between said longitudinal struts (6) for rotary driving of the insertable tool (2) when the insertable tool (2) is inserted in the tool holder, an impact bolt (24) arranged for impact on the tool shaft (11) of the insertable tool when the insertable tool is inserted in the receiving sleeve (21) and at least one locking body (23) arranged between two adjacent ones of said longitudinal cleats (25) so that said at least one locking body (23) is radially movable between a locking position locking the insertable tool (2) in the receiving sleeve (21) and another position in which the insertable tool is released from the receiving sleeve.

* * * * *